UNITED STATES PATENT OFFICE.

AUGUSTUS A. HAYES, OF ROXBURY, MASSACHUSETTS.

IMPROVEMENT IN THE PROCESS FOR EXTRACTING TANNIN FROM BARK.

Specification forming part of Letters Patent No. 836, dated July 12, 1838.

*To all whom it may concern:*

Be it known that I, the undersigned, AUGUSTUS A. HAYES, of Roxbury, in the county of Norfolk and Commonwealth of Massachusetts, have invented an improved process for preparing tannin and solutions of tannin from astringent barks for the purposes of tanning hides and skins generally, called "oak" tannin, "hemlock" tannin, or "solution of oak-tannin or hemlock-tannin," according to the kind of bark used, of which the following is an exact description.

I place in suitable vessels, the contents of which can be heated by steam or otherwise, the quantity and kind of bark to be operated on after it has been deprived of its outer coat or "ross," and add hot or cold water sufficient to cover the bark. I then dissolve so much of alkaline salts of either ammonia, potash, soda, or lithia, or of these alkalies in a pure state, as may be required to neutralize four-fifths of the acid naturally contained in these barks (which quantity varies according to the season of cutting the bark) in one barrel of hot or cold water, and mix the alkaline solution so obtained with the bark and water by strong agitation. I allow the mixture to remain one hour, and after that time heat the whole to near the boiling-point of water, withdraw the heating source, and allow the clear liquor to drain from the bark. I wash the bark which remains with the weak liquors which have been used for washing other portions of bark, and mix the liquor which drains from the bark with that previously obtained, so long as it is denser than what remains is used for washing the next quantity of bark. If I operate without applying heat to the mixture, I allow it to remain twenty-four hours mixed, instead of one hour, and then proceed as above described.

The solution of oak or hemlock tannin thus obtained may be used for tanning operations generally, or for concentration, by which the watery part is dissipated by heat and the bulk and weight of the tannin greatly reduced. If I operate on one hundred and twenty-eight cubic feet or one thousand one hundred and twenty-two pounds avoirdupois of dry hemlock-bark deprived of its outer coat or ross, I use and prefer eleven pounds of dry carbonate of soda, called "soda-ash," or sixteen pounds of carbonate of potash, called "pearlash," although the alkaline bases of these salts and other alkalies in equivalent proportions will serve for neutralizing four-fifths of the acid naturally contained in that bark; and these are the mean quantities required. I then extract the tanning principle by the method described above, and if it is to be carried to distant parts I concentrate it by boiling in vessels of lead, tin, or copper heated below 300° Fahrenheit by steam or baths until it is reduced to the form of a consistent paste.

I claim as my own unaided invention—

The process above set forth by which the alkalies, ammonia, soda, potash, and lithia, or the alkaline salts of these bases, are used for neutralizing the acid existing in astringent barks and extracting by their means the tanning principle in a state better fitted for use than by any other known process.

In testimony whereof I, the said AUGUSTUS A. HAYES, hereto subscribe my name, in the presence of the witnesses whose names are hereto subscribed, on the 28th day of May, A. D. 1838.

AUG. A. HAYES.

Witnesses:
JAS. RUSSELL,
LINCOLN FEARING.